United States Patent [19]

Blatter et al.

[11] 4,186,602

[45] Feb. 5, 1980

[54] HIGH RESPONSE AUTOMOTIVE MASS AIR FLOW SENSOR

[75] Inventors: Albert Blatter, Southfield; John Miller, Auburn Heights, both of Mich.

[73] Assignee: The Bendix Corporation, Southfield, Mich.

[21] Appl. No.: 935,428

[22] Filed: Aug. 21, 1978

[51] Int. Cl.² ............................................. G01F 1/28
[52] U.S. Cl. ................................... 73/228; 73/231 M
[58] Field of Search ........... 73/231 M, 194 M, 231 R, 73/228, 229, 230

[56] References Cited

U.S. PATENT DOCUMENTS

| | | | |
|---|---|---|---|
| 1,665,141 | 4/1928 | Mayer | 73/228 |
| 2,714,310 | 8/1955 | Jennings | 73/194 |
| 2,800,794 | 7/1957 | Meneghelli | 73/228 |
| 2,811,855 | 11/1957 | Kotas | 73/228 |
| 2,975,635 | 3/1961 | Kindler et al. | 73/231 M X |
| 3,092,994 | 6/1963 | Moller | 73/228 X |
| 3,164,017 | 1/1965 | Karlby et al. | 73/194 |
| 3,199,347 | 8/1965 | Moss | 73/194 |
| 3,306,105 | 2/1967 | Ichihara et al. | 73/194 |

Primary Examiner—Jerry W. Myracle
Attorney, Agent, or Firm—Gaylord P. Haas, Jr.; Russel C. Wells

[57] ABSTRACT

A restrained turbine high dynamic response mass rate of fluid flow sensor for applications to air flow sensing in internal combustion engine fuel controls. The turbine rotor vanes impart an angular momentum change to the fluid in passing through the turbine vanes and signals are generated corresponding to the resulting reaction forces, these signals combined with signals corresponding to the fluid temperature and downstream pressure to yield mass rate of flow output signals. Variations of the turbine rotor support configurations include a friction free flexural restraint comprised of radial webs which may also act as stator vanes, secured to the turbine hub. In several embodiments, reaction forces are sensed by measuring the reactive torque imposed on the turbine rotor and the flexural restraint supporting the rotor provides a rigid support for absorbing the radial and axial forces while being compliant to torque. In these embodiments, the torque is measured either by allowing limited deflection against the resilience of the flexure and measuring the deflection, or by rigidly resisting angular deflection and measuring the reaction force with a force sensing transducer. In a torque sensing embodiment, a nonlinear spring opposes the angular deflection of the turbine rotor to produce an angular deflection decreasing with increasing flow rates to vary the relationship of the output signals of the sensor in relation to the mass flow rate. In an alternate embodiment, the turbine support is compliant to the axial reaction forces acting on the turbine rotor, and a force transducer absorbing the axial forces generates signals corresponding thereto. An optimum ratio of the turbine hub diameter to outer vane diameter is disclosed.

32 Claims, 19 Drawing Figures

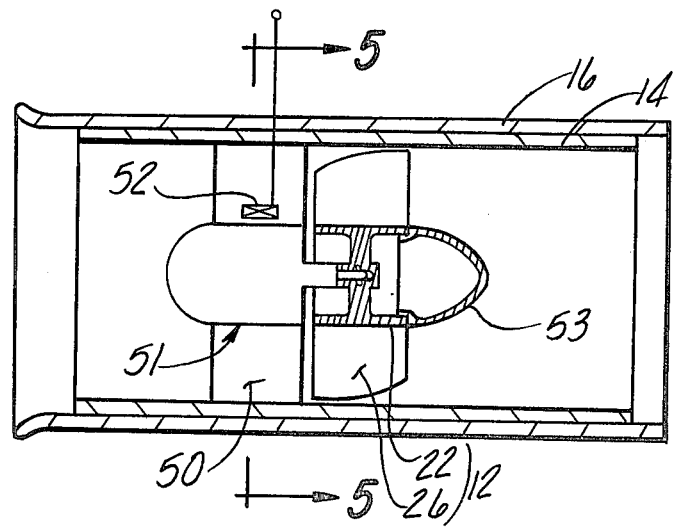
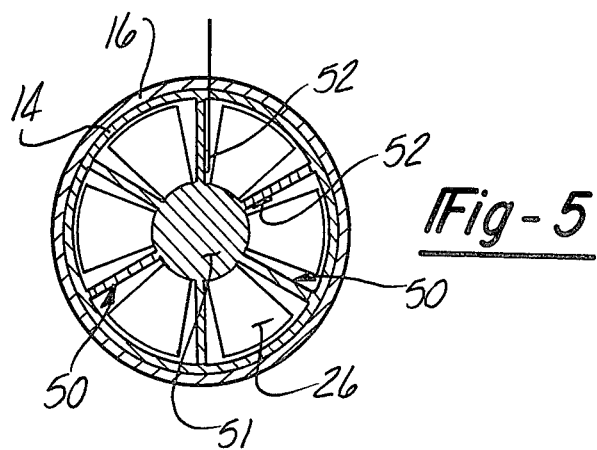
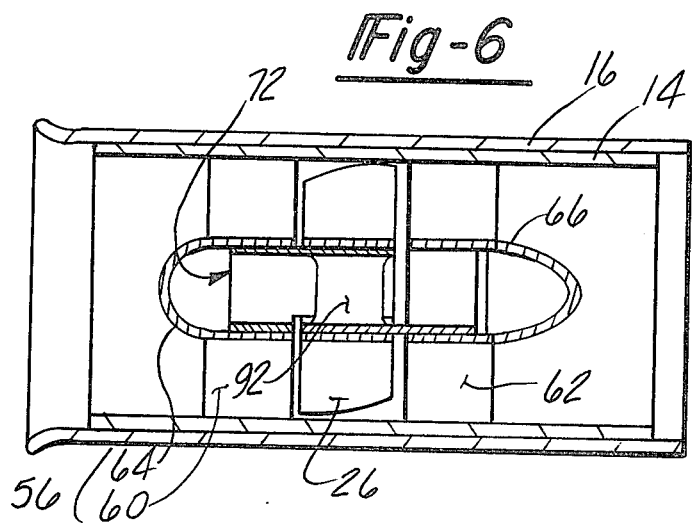

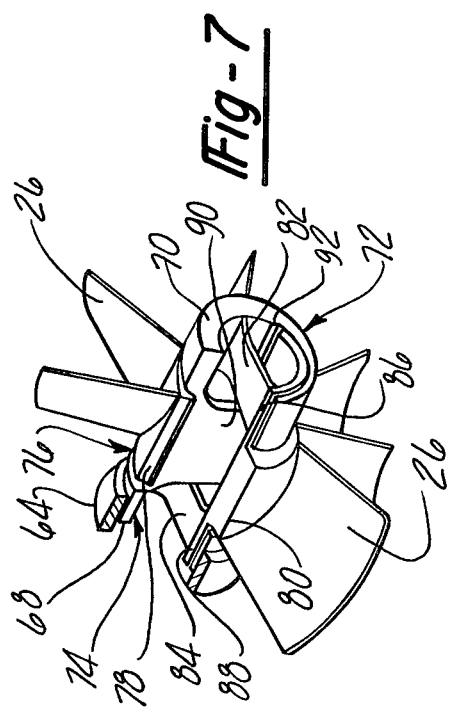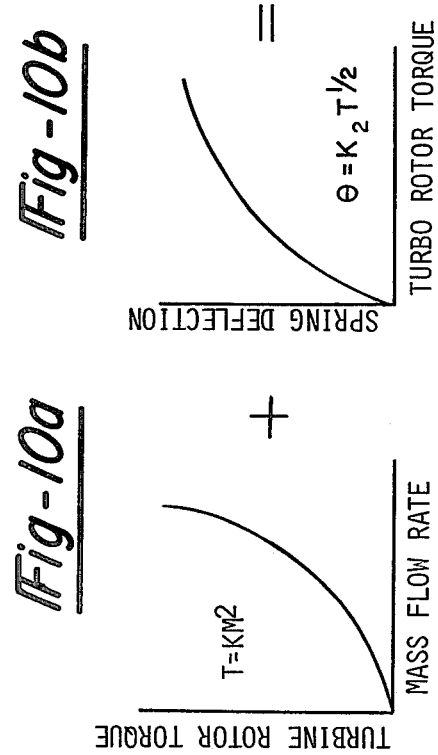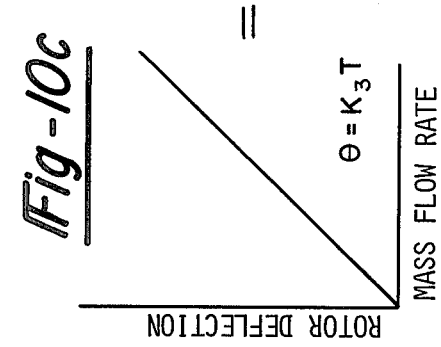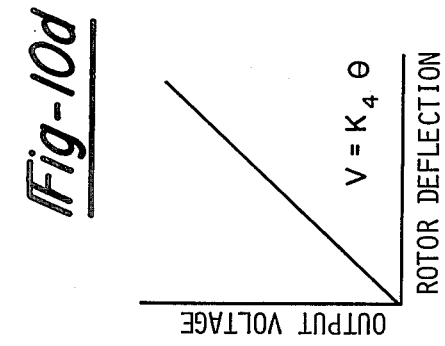

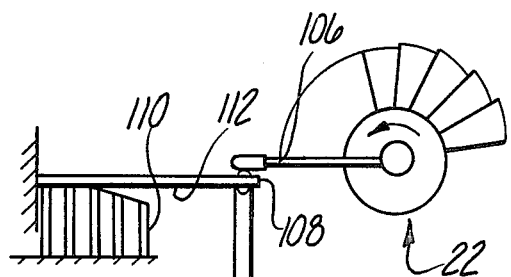
*Fig-11*
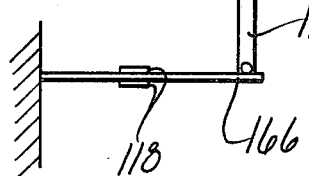
*Fig-12*
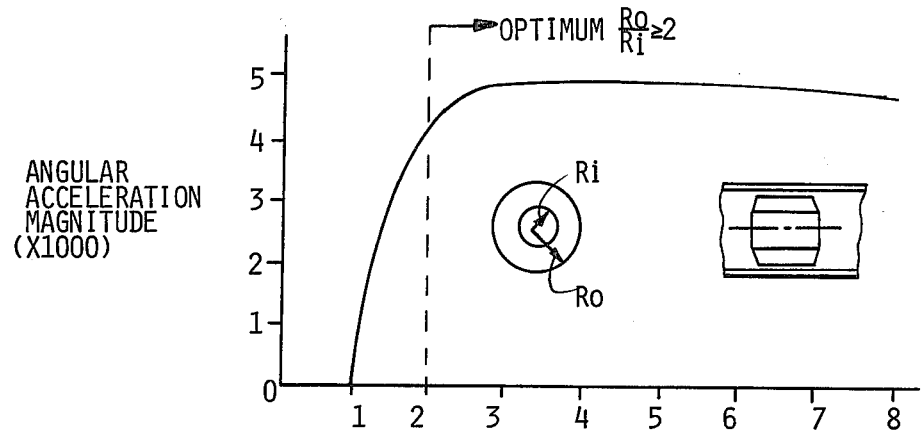
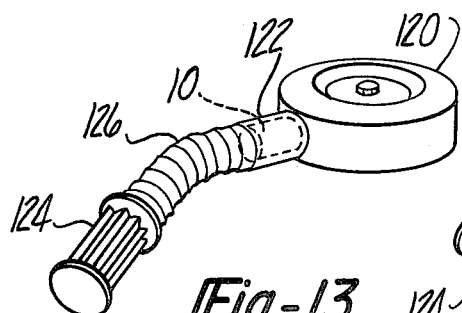
*Fig-13*
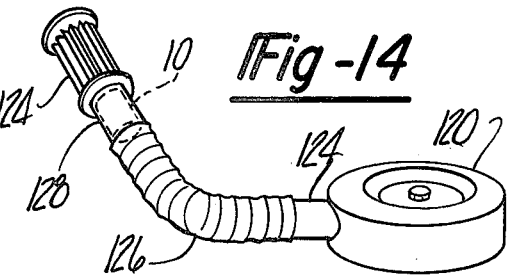
*Fig-14*

HIGH RESPONSE AUTOMOTIVE MASS AIR FLOW SENSOR

BACKGROUND OF THE INVENTION

1. Field of the Invention

This invention concerns fluid flow rate sensing and more particularly the sensing of mass rate of flow of a compressible fluid such as air.

2. Background of the Invention

There is an increasing emphasis on precise fuel management for internal combustion engines due to the need for greatly decreased emissions of undesirable components of the exhaust gases as well as heightened need for improvements in fuel economy. This has led to the development of highly sophisticated fuel management systems which precisely control the delivery of fuel to the engine cylinders in accordance with various operating conditions of the engine. One such factor in determining the proper fuel quantity to be added to the air charge under a given set of operating conditions is the precise rate of mass flow of the air into the engine cylinders.

One approach to determining the air mass flow rate in current usage is to calculate the mass flow rate from the engine intake manifold absolute pressure and measured engine speed and ambient temperatures. However, there is an inherent time lag in such an approach, as well as certain resultant inaccuracies since the point at which the pressure is sensed is remote from the point at which the actual movement of air occurs, i.e., at the throttle plate. The relatively slow response of such an approach imposes certain performance limitations on these fuel control systems, since accuracy is thereby affected.

In automotive applications, cost is of course on all important factor, as is the difficult operating environment, in which wide temperature variations are encountered, as are mechanical vibration and the presence of dirt, water, hydrocarbon vapors. This situation is aggravated by a relatively low level of maintenance.

The traditional approach to measuring mass fluid flow rates has been with Pitot-Venturi Meters, which measure the velocity head of the fluid with temperature and static pressure sensing utilized to convert the dynamic pressure readings to mass flow rates. This approach is deficient in respect to the above applications since the dynamic pressure sensed is rather low at low mass flow rates and thus difficult to accurately measure. The Pitot tube does not sample the entire flow, but rather measures the velocity head only at that point within the passage in which it is located. Since local flow rate variations across the passage are normally encountered, inaccuracy is inherent in this approach. While multiple Pitot tubes have been utilized, and the pressure head distribution across the passageway calculated to account for these variations, inaccuracies still inevitably occur.

Various turbine type flow meters have also been utilized to measure fluid flow. In one such design, a turbine is rotated by the fluid flow and is designed to be of minimum friction and moment of inertia such that the rate of rotation of the turbine is directly proportional to the speed of the fluid. If the fluid is of a compressible nature and/or the system conditions were to change significantly such as to affect the density of the fluid flowing therethrough, fluid pressure and temperature must be measured in conjunction with the rate of rotation to calculate the mass flow rate. This approach would have substantial disadvantages in the context of automotive applications, since the high inertia of the turbine created by its relatively high operating velocities create poor dynamic response since the turbine must be decelerated or accelerated by the changes in fluid flow rates. The different rates of flow rate change encountered in the automotive application described are relatively great and must be sensed with a sensor having a high dynamic response. In addition, while the turbines are designed to be supported for rotation as frictionlessly as possible, the friction that is inevitably present creates hysteresis and loss of accuracy in the sensor. Finally, the delicacy of such sensors would lead to poor field life in the automotive environment.

Several restrained turbine type sensor designs have also heretofore been developed such as disclosed in the patents to Kindler et al, U.S. Pat. No. 2,975,635; Karlby et al, No. 3,164,017; Tatsuya Ichihara et al, No. 3,306,105; and Jennings et al, No. 2,714,310. These patents seek to directly measure mass flow rate by imparting an angular momentum to the fluid prior to entering a restrained turbine, the angular deflection of the turbine corresponding to the mass rate of flow of the fluid. However, these systems require a rotating turbine to impart the angular momemtum to the fluid in addition to the restrained turbine. The accuracy of the system is subject to the limitation that the precise level of angular momentum imparted by the rotating turbine cannot be precisely controlled. In addition, many of these designs do not receive the entire fluid flow within the passage, but rather only sample a portion of the flow which accordingly affects accuracy since nonuniform or locally unpredictable variations in fluid flow rate are usual.

In the Moller U.S. Pat. No. 3,092,994, there is disclosed a system for improving the response of a restrained turbine sensor by a circuit which measures the velocity of change of the turbine element such that it would not require the achievement of the final position before the torque which was being impressed on the turbine could be sensed. However, this approach, as in many of the rotating turbine approaches, require a slider-type contact, adding to the friction of the setup and creating hysteresis. In addition, the turbine has a bearing support for the turbine, adding further to the friction and hysteresis of the unit.

A relatively simple approach to flow measurement disclosed in U.S. Pat. No. 1,665,141 to Mayer describes the use of an bladed screw element which receives all of the fluid flow and the resulting torque being impressed thereon by the change in angular momentum of the fluid as it passes through the bladed screw causing a pivot shaft to be rotated against a spring system with the relative angular deflection of the pivot shaft producing an indication of the torque produced. This system, however, does not lend itself to applications in which widely varying temperature-pressure conditions are to be encountered and also the restriction of the bladed screw creates a relatively high pressure loss in the system. In addition, the pivot shaft is frictionally supported in bearings and involves a relatively great mass such that the dynamic response of the unit would not be high and the hysteresis involved would adversely affect accuracy. The mechanical type readout of course could not be directly utilized in the electronic fuel control system referred to above.

Another mechanical approach is described in the patent to Meneghelli, U.S. Pat. No. 2,800,794, in which the elastic couplings are utilized to join a tubing section containing a helical element, with the torque induced by the flow through the helical element causing a relative rotative angular deflection of the tubing sections joined by means of the elastic coupling. The high inertia of the helical element would produce poor dynamic response.

A variation of this system is disclosed in the Kotas U.S. Pat. No. 2,811,855, in which a deflector plate is located in a tubing section. The deflection plate creates a strain in the tube which is sensed by the strain gage arrangement producing electrical signals corresponding to the torque produced by the change in angular momentum of the fluid. While providing an electrical signal output, the sensor according to this patent is subject to external physical abuse since the sensing tubes are externally located and errors in readings could be produced by the stressing of the tube by externally applied forces.

Other approaches which do have suitably high response characteristics include a hot wire anemometer which, while suitable for a laboratory application, requires expensive and elaborate instrumentation such as to preclude its adaptation to the application described.

Accordingly, the prior art as described can be characterized as collectively suffering from a number of deficiencies in the automotive application described: poor dynamic response; excessive hysteresis and friction losses; inaccuracies due to a failure to measure the entire flow, i.e., sampling systems; excessively complex and expensive components; undue delicacy of construction, such as to be unsuitable for the automotive environment; inaccuracies due to a failure to compensate for change in density due to temperature and pressure variations; and excessive pressure losses due to the restrictive effect of the sensor in the flow passage.

It is accordingly an object of the present invention to provide a fluid mass flow rate sensor for sensing the mass rate of flow of a fluid flowing in a passageway which is especially adapted to compressible fluids which are subjected to substantial variations in pressure and temperature in the operating environment.

It is a further object of the present invention to provide such a mass flow rate sensor which has extremely high dynamic rates of response.

It is still a further object of the present invention to provide a mass flow rate sensor which is extremely accurate and which directly measures all of the fluid flow and which minimizes hysteresis and frictional losses.

It is still another object of the present invention to provide such a mass fluid flow rate sensor which is relatively rugged in construction and comprises relatively simple components such as to minimize its cost and its vulnerability to failure in the automotive environment.

It is yet another object of the present invention to provide such fluid flow mass rate sensor which generates an electrical signal which may be directly utilized in electronic fuel control systems.

It is still another object of the present invention to provide such a fluid flow rate sensor which generates electrical signals which vary with mass flow rates in such a way as to be optimally usable in such electronic fuel control systems.

It is still another object of the present invention to provide such a mass fluid flow rate sensor in which the various components are optimized in configuration to produce maximum sensitivity of the sensor.

SUMMARY OF THE INVENTION

These and other objects of the present invention, which will be appreciated upon a reading of the following specification and claims, are accomplished by a mass fluid flow rate sensor comprised of a turbine rotor mounted in a tubular sensor housing disposed in the flow passage receiving the fluid flow to be measured, the turbine having a hub portion with the turbine vanes mounted about the hub and through which the entire fluid flow passes. The turbine vanes are helically curved so as to efficiently impose an angular momentum change on fluid passing through the turbine rotor, and the turbine rotor is restrained against movement in the sensor housing in response to reactive forces acting on the turbine rotor created by the momentum change of the fluid reactive forces. Signals corresponding to the reactive forces are generated and combined with a fluid pressure and temperature sensor signal to enable computation circuitry to generate output signals corresponding to the mass flow rate through the sensor. The minimum angular movement of the turbine rotor creates a high dynamic response. The turbine rotor is supported within the sensor housing by arrangements which provide a rigid support for reactive forces acting on the turbine other than the reactive force which is sensed to determine the angular momentum change of the fluid while being compliant to the sensed force. In most of the embodiments, the reactive force is sensed by measuring the torque acting on the turbine rotor and in these embodiments the support is by means of frictionless flexural restraints compliant to angular deflection of the turbine rotor, which in some embodiments also act as stator vanes located upstream of the turbine rotor absorbing any angular momentum of the fluid prior to entering the turbine rotor.

The reaction forces are sensed either directly by zero deflection force transducers or by sensing the deflection of the turbine rotor against a resilient restraint, and in these instances, the flexural restraint also provides the resilient restraining force reacting against the torque produced by the angular momentum change of the fluid flow. The deflection of the flexural restraint is used to sense a reactive force induced torque acting on the turbine rotor and which deflection is either directly sensed by means of strain gages or sputtered resistive material on the flexural restraint or alternatively a displacement transducer may be provided driven by an arm drivingly connected to the turbine rotor.

In one alternative embodiment, the torque component of the reactive force produced on the turbine rotor is resisted by a nonlinear spring so as to convert the inherently nonlinear torque function of mass flow into a linear rotor deflection with mass flow to produce a linear output function.

Alternatively, the reactive force is measured directly by means of zero displacement force transducers on which a force is exerted by the reactive force acting on the turbine rotor. In the embodiment sensing reactive torque, an arm is driven by the turbine rotor acting on the force transducer.

Another variation is that the axially reactive force is measured by a frictionless translational mounting of the turbine rotor within the flow passage.

The electrical signal output of the reactive force sensing arrangement is combined with signals from pressure-temperature sensors to allow computing of the mass rate of flow.

The optimum ratio between the hub and turbine rotor hub diameter and the outer diameter of the turbine is greater than 2.0 to produce maximum dynamic response of the sensor for a given change in angular momentum imposed on the fluid flowing through the turbine rotor in those embodiments sensing reactive torque.

In one torque sensing embodiment, a particular flexural pivot is provided which is combined with axially rigid stator vanes while in another embodiment the stator vanes are disclosed as being resiliently compliant to rotation to provide the flexure directly by means of the stator vanes. The particular flexural pivot incorporates a mechanical stop such as to limit the angular deflection of the turbine rotor to prevent damage due to transient high flow conditions such as during engine backfires.

The turbine rotor may be mechanically damped in order to limit the effects of oscillations due to the spring support of the turbine rotor and/or the signal output produced by the force sensing arrangement may be passed through a notch filter to eliminate the signal value oscillations created by the excitation of the spring-mounted turbine by the air flow therethrough.

The sensor housing is adapted to be received within the snorkel tube input of an engine air cleaner or may also be mounted to receive radial flow through the air cleaner flowing into the throttle body, to sense flow just upstream of the throttle plate by means of a radial flow turbine geometry.

BRIEF DESCRIPTION OF THE DRAWINGS

FIG. 4 is a longitudinal section through one embodiment of the turbine rotor support arrangement mounting the turbine rotor within the sensor housing.

FIG. 5 is a view of the section 5—5 taken in FIG. 4 showing the relative positioning of the stator vanes and the turbine rotor vanes, and torque sensing transducers.

FIG. 6 is a view in longitudinal section of a second embodiment of the turbine rotor support arrangement according to the present invention.

FIG. 7 is an enlarged fragmentary perspective view of the details of the mounting arrangement shown in FIG. 6.

FIGS. 10a–10d are plots showing the effect of the use of a nonlinear spring in conjunction with a linear turbine rotor flexural restraint on the overall deflection of the turbine rotor in response to varying mass flow rates.

FIG. 11 is a diagrammatic representation of one form of a nonlinear spring contemplated for use in conjunction with the linear turbine rotor sensor.

FIG. 12 is a plot of the angular acceleration produced by flow rate for varying ratios of outside radius and inside radius of the turbine rotor.

FIG. 13 is a perspective view of an automotive inlet plenum chamber with the air flow sensor according to the present invention installed in the inlet snorkel tube.

FIG. 14 is a perspective view of an automotive inlet plenum chamber showing the mass flow rate air sensor installed in a lead-in tubing to the inlet plenum snorkel tube.

DETAILED DESCRIPTION

Figure 1:
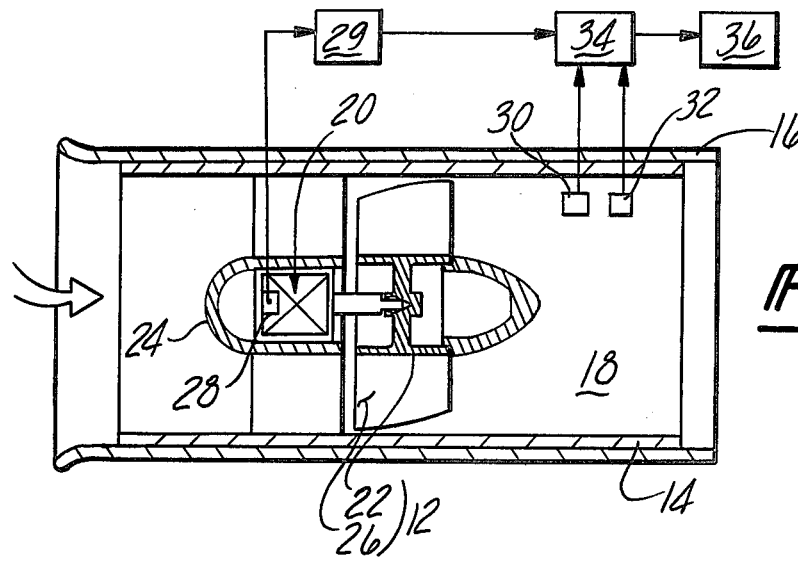
FIG. 1 is a sectional view of the flow sensor arrangement according to the present invention with the sensor housing in longitudinal section.

In the following detailed description, certain specific terminology will be utilized for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

The mass rate of flow sensor of the present invention is provided by an arrangement including a turbine rotor and a sensor housing, the sensor housing having a circular section passage within which the turbine rotor is supported. The turbine rotor is provided with turbine vanes affixed to a hub portion of the turbine rotor, configured and disposed within the sensor housing such that the entire fluid flow passes through the turbine vanes and is imparted with an angular momentum change by the curvature and angle of attack of the turbine vanes. A reactive force acting on the turbine blades is generated corresponding to the change in angular momentum imposed on the fluid flowing through the turbine rotor to obtain a signal corresponding to the density and velocity of the fluid flowing through the turbine. This signal is combined with either upstream or downstream pressure and temperature signals which compensate for the local sensor pressure and temperature variations in the fluid such that a final mass flow rate signal may be generated for use in the utilization device such as the fuel management system described above.

In sensing the reactive force, the turbine rotor is supported within the sensor housing by support means which provides a rigid support for the turbine rotor resisting all other forces which may act on the turbine rotor other than the sensed reactive forces. In the embodiments described, the turbine rotor vanes are helically curved such that axial and circumferentially directed forces are efficiently generated and act on the turbine rotor. The circumferential forces produce a reactive torque which in the preferred embodiment is measured to determine the reactive force sensed.

In a second embodiment, the axial reaction forces acting on the turbine rotor is directly sensed.

In those embodiments in which the reactive torque is sensed, a flexural restraint is provided which resists axial and radial movement of the turbine rotor while allowing angular deflection of the turbine rotor within the sensor housing. The reactive force is alternatively sensed either by sensing the deflection of the turbine rotor against a resilient force acting against the reactive torque or the torque is sensed directly by means of a zero deflection force transducer upon which is imposed a force corresponding to the reactive torque acting on the turbine rotor. In those instances where the angular deflection is sensed, the flexural restraint provides the resilient force which in one alternative variation of this embodiment the resilient force of the flexural restraint is combined with a nonlinear spring which modifies the deflection characteristics of the turbine rotor flexural restraint such that larger deflections occur for incremental changes in flow rates at relatively low flow rates and relatively smaller deflection occurs for incremental changes in flow rates at relatively high flow rates through the fluid flow sensor. This allows a linear output signal to be generated from the inherently nonlinear relationship of mass rate of flow and torque.

Thus, the turbine rotor may be supported in a variety of manners, depending on the manner of sensing of the reactive force, i.e., either by measuring axial force or the torque, and also as to whether the deflection of the turbine rotor is sensed in order to sense the reactive force or whether this reactive force is sensed directly by means of a force transducer.

These various turbine mounting arrangements are depicted in the drawings in FIGS. 1, 2 and 4 through 9.

Figure 2:
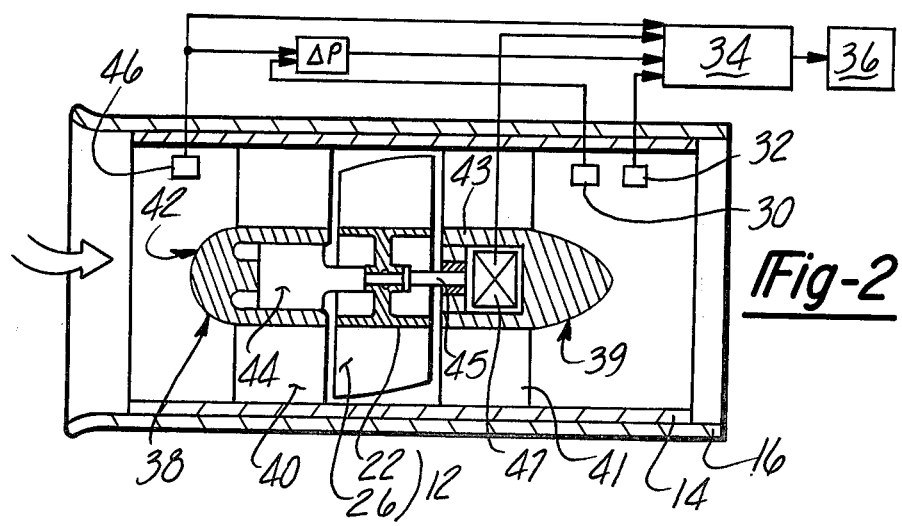
FIG. 2 is a sectional view of an alternate embodiment of the flow sensor according to the present invention shown in diagrammatic form with the sensor housing in longitudinal section.

In FIGS. 1 and 2 is depicted the alternative variation of the fluid flow sensor configuration corresponding to sensing of the reactive torque and the reactive axial force, respectively.

Referring to the drawings and particularly FIG. 1, the torque sensing form of the fluid mass flow rate sensor, according to the present invention, is depicted and comprises a turbine rotor 12 mounted within a circular in section passage formed in a sensor housing 14 by a section of tubing, which may be mounted within the flow passage within which the mass flow rate is to be sensed, represented in fragmentary form in FIG. 1 as the snorkel intake 16 of the engine air cleaner or plenum chamber.

Turbine rotor 12 is supported within the opening 18 within the sensor housing 14 by support means comprised of a flexural restraint means 20 indicated diagrammatically in FIG. 1. The flexural restraint means 20 may also act as stator vanes as will be described hereinafter in reference to the various support arrangements to be disclosed, but comprises a frictionless bearing flexure which provides rigid support in the axial and radial directions, but while restraining the turbine rotor from angular deflection, is relatively compliant to limited angular deflection.

Turbine rotor 12 includes a hub portion 22 which is fixed with a housing portion 24 supported by means of the flexural restraint 20. In addition, a plurality of radially extending turbine rotor vanes 26 are provided which preferably are helically curved to achieve maximum aerodynamic efficiency, as is well known to those skilled in the art.

The vanes 26 may be comprised of air foil shapes or simply formed sheet metal sections affixed to the turbine hub portion 22. The outer radius of the turbine rotor 12 is such as to substantially completely occupy the passage 18. In addition, the turbine rotor solidity, i.e., the ratio of the vane chordal distance to vane spacing, should be 1.0 or more in order to provide a configuration such that the entire fluid flow is deflected by the blades and imparted with an angular momentum with respect to the sensor housing.

Also included is a reactive torque sensing means associated with the flexure 20 as indicated diagrammatically at 28, which measures the reactive torque of the turbine rotor 12 caused by deflection of the fluid flow passing through turbine vanes 26. The circumferential reactive forces acting on the turbine rotor are created by the helically curved vanes 26 acting to induce a whirl velocity in the fluid stream by changing the direction of the flow path through the rotor 12. This change in direction is manifested by a change in the angular momentum of the fluid. The turbine vanes 26 impart this reactive force to the rotor hub.

Flexural restraint means 20 allows limited rotation of the turbine rotor 12 against a spring force which balances the reactive torque in those embodiments allowing limited rotation. Thus, the torque acting on the turbine rotor 12 corresponds to the circumferential reactive force acting in the turbine rotor 12 due to the angular momentum change imposed on the fluid being deflected by the curved turbine vanes 26. The torque sensor 28 produces electrical signals corresponding to the torque level generated in the flexural restraint means 20.

Since the flexural restraint means 20 constitutes a spring mount for the turbine rotor 12, oscillations of the turbine rotor 12 may occur at the resonant frequency of the mass-spring system defined by the turbine rotor 12 and the flexure 20 for those embodiments in which angular deflection occurs. In this instance, if a mechanical damping is not provided and the aerodynamic damping is not adequate to eliminate these oscillations, an electrical notch filter circuit 29 may be provided to eliminate the resonant frequency component of these oscillations from the output signal.

Also included is a pressure sensor 30 and a temperature sensor 32 which provide a means for generating electrical signals corresponding to the downstream pressure from the rotor respectively and the temperature of the fluid flowing through the sensor.

Since the pressure losses are modest, the pressure variations should not be large and the temperature variations over a short period of time are not great such that relatively low cost sensor elements may be utilized for this purpose.

These electrical signals are combined in a computation circuitry means which can be provided by conventional integrated circuits and/or microprocessors, or by the fuel control system processing circuitry to generate an output electrical signal corresponding to the mass flow rate occurring within the sensor 10, generated from the aforementioned torque, pressure and temperature signals. This electrical signal is then transmitted to the utilization device 36 which in the contemplated application would comprise an electronic fuel control system.

Broadly, the turbine rotor 12 provides the means for imparting an angular momemtum change on the entire fluid flow passing through the fluid flow sensor which produces a circumferentially directed reactive force on the turbine rotor which produces a torque in the embodiment shown in FIG. 1. The torque producing component of this reactive force is sensed by either sensing the angular deflection of the turbine rotor against the spring force produced by the flexure support 20, or by a force transducer which directly measures torque level. The change in momentum in the fluid indicates the mass and the velocity of the fluid such that by sensing the pressure and temperature of this fluid to determine the fluid density, the mass rate of flow and given fluid can be computed for a given geometry of the turbine, since there is thus sufficient signal data present to precisely determine the mass flow rate through the sensor 10.

Figure 3:
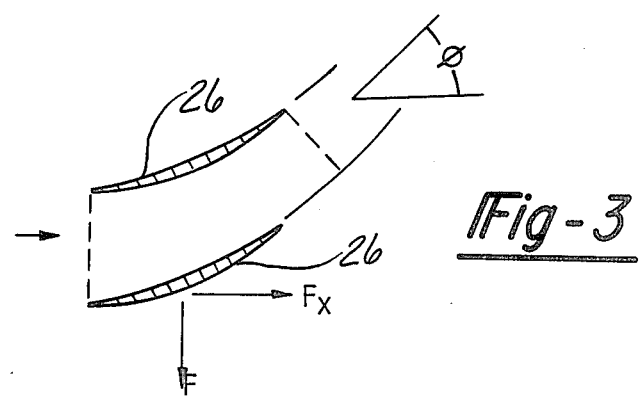
FIG. 3 is a diagrammatic representation of a pair of turbine rotor blades from a turbine cascade, together with the notation utilized in the mathematical analysis.
Figure 8:
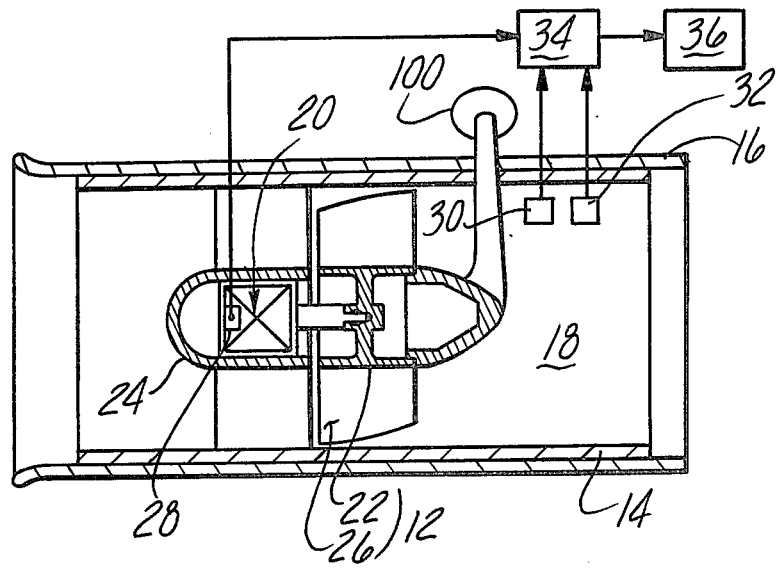
FIG. 8 is a view in longitudinal section of another embodiment of the turbine support arrangement according to the present invention.
Figure 9:
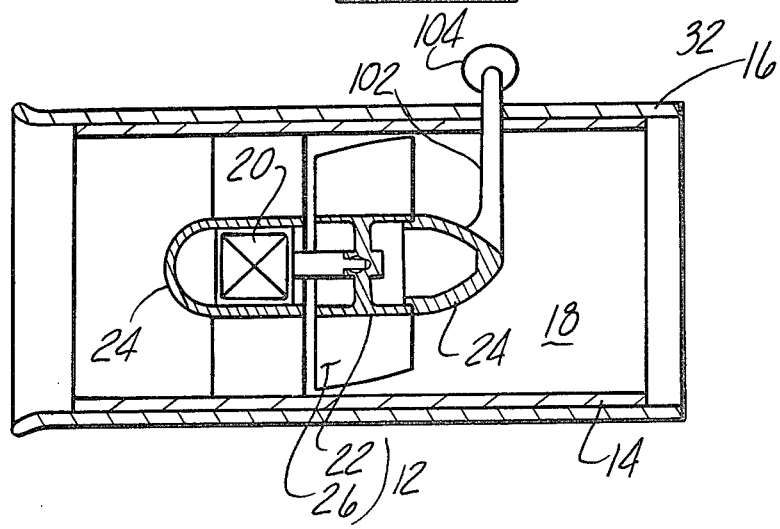
FIG. 9 is a view in longitudinal section of yet another embodiment of the turbine rotor support arrangement according to the present invention.

This is demonstrated in mathematical terms by the following analysis in which:

$T_o$ is the torque produced by the circumferentially directed reactive force F indicated in FIG. 3 acting on the lever arm provided by the effective radius of the turbine blade curvature;

$\dot{m}$ is the mass flow rate;

r is the effective radius of the turbine vanes;

V is the velocity of the fluid;

R is the universal gas constant;

T is the temperature in degrees Rankin;

P is the absolute pressure of the fluid;

$P_1$ is the pressure upstream of the turbine rotor;

$P_2$ is the pressure downstream of the turbine rotor;

$A_1$ is the effective area between the vanes at the inlet side of the vanes;

$A_2$ is the effective area between the vanes at the outlet side of the vanes;

$\rho$ is the density of the gas which is taken as P/RT.

$$T_o = \dot{m}(\Delta V)$$
$$T_o = \dot{m}(V_2 \sin\theta - 0) + rP_2 A_2 \sin\theta$$
$$= \dot{m}\left(\frac{\dot{m}RT}{P_2 A_2}\sin\theta\right) + rP_2 A_2 \sin\theta$$
$$= \frac{\dot{m}^2 RT}{P_2 A_2}\sin\theta + rP_2 A_2 \sin\theta$$
$$\therefore \dot{m} = \left(-\frac{P_2^2 A_2^2 \sin\theta}{rRT \sin\theta} + \frac{P_2 A_2 T_o}{rRT \sin\theta}\right)^{\frac{1}{2}}$$
$$\dot{m} = \left(\frac{T_o P_2}{T}\frac{(A_2)}{(Rr\sin\theta)} - \frac{P_2^2}{T}\frac{(A_2^2)}{(R)}\right)^{\frac{1}{2}}$$

Let $\frac{A_2}{Rr\sin\theta} = k_1$ and $\frac{A_2^2}{R} = k_2$

Then: $\dot{m} = \left(T_o \frac{(P_2)}{(T)} k_1 - \frac{(P_2^2)}{(T)} k_2\right)^{\frac{1}{2}}$ Accordingly, the mass flow rate m is known for a given geometry and fluid if the pressure $P_2$, the temperature T and the torque are known. The equation can thus be solved by appropriate computation circuitry or a suitably programmed microprocessor, generating a signal corresponding to mass flow rate.

It can be seen that since the angular movement of the rotor is either relatively slight in the deflection sensing embodiments or stationary in the direct force sensing arrangements as will be described hereinafter, the effect of rotor inertia forces are greatly reduced and approach zero as the deflection approaches zero.

As noted in FIG. 3, the reactive force produced by the angular momentum change created by the curvature of the rotor vanes 26 also produces an axially aligned reactive force component indicated as $F_x$ in FIG. 3.

Accordingly, in FIG. 2 there is shown an arrangement wherein the turbine hub 22 is mounted for frictionless axial translational movement by front and rear support hubs 38 and 39, respectively. The support hub 38 may take the form of an array of stator vanes 40 located upstream of the turbine rotor 12 with a central hub 42, into which is disposed a leading end 44 of the turbine rotor hub portion 22 shaped to preclude rotation within the central hub 42 and absorb the rotative reaction of the turbine rotor 12. The rear support hub 39 includes stator vanes 41 with a central hub 43 receiving a trailing extension 45 of the turbine rotor hub portion 22. This arrangement provides a support which prevents radial movement of the turbine rotor 12.

The purely axial reactive force is sensed by means of an axial force sensor 47, connected to the end of the trailing extension 45 to impose the axial reaction force thereon. The force sensor 47 generates a corresponding electrical signal with the rotative load being supported by the support hub 42, which signal may be combined in the computation circuitry means 34 together with the downstream pressure sensor 30 and a temperature sensor 32 and also in addition an upstream pressure sensor 46. The upstream pressure sensor 46 is required in this embodiment since the axial force is also related to the pressure drop across the turbine rotor blades 26.

This design also likewise produces an output electrical signal directly corresponding to the mass flow rate through the sensor 10 which may be utilized in the utilization device 36 in similar fashion.

Since the axial force component embodiment requires the sensing of the upstream pressure by means of the sensor 46, this embodiment is not preferred, but nonetheless, it has the capability of producing the output signal described.

Relating to an important feature of the present invention, the turbine rotor 12 is supported by the flexural restraint means such as to provide both the structural support means for the turbine rotor 12 and in addition may comprise a stator vane array for controlling the angular momentum of the fluid prior to its passage through the turbine rotor 12. The presence of such angular momentum in the fluid prior to entry into the turbine rotor vanes 26 will produce an inaccuracy since the torque will not entirely be produced by the turbine vanes.

In addition, the flexural support 20 will also provide the spring means for resisting the angular deflection of the turbine rotor 12 in those embodiments in which such angular deflection is utilized to sense the reactive torque. Consequently, it is also provided with means for generating an electrical signal corresponding to such deflection as will be described, by means of strain sensing means associated directly with flexural restraint elements themselves.

In the simplest form, shown in FIGS. 4 and 5, the flexural restraint means may be comprised of a plurality of relatively thin radially extending webs 50, acting as stator vanes by being located upstream of the sensor 10 and extending so as to be fixed at their outer edges to sensor housing 14 and the interior edges to be affixed to the turbine rotor 12 via the leading hub portion 51, such as to constitute support means for the turbine rotor 12. The stator vanes 50 are designed to be relatively thin in section such as to be compliant in bending and offer minimum resistance to rotation of the turbine rotor 12 through small increments of angular deflection such as to provide a resilient support for the turbine rotor 12.

As seen in FIG. 5, the stator vanes 50 are parallel with the turbine rotor axis and preferably located intermediate each of the turbine vanes 26 so as to minimize the effect of turbulence on the fluid flow passing through the rotor vanes 26, i.e., they are located out of the wake induced by the passage of the fluid flow between the stator vanes 50.

A strain sensing means indicated at 52 may be associated with one or more of the stator vanes 50 to provide an electrical signal output which corresponds to the angular deflection of the turbine rotor 12 resulting in bending deflection of the vanes 50, which deflection will exhibit good linearity with increasing torque levels such as to preserve the linear mass flow rate-torque signal relationship.

Thus, the stator vanes 50 act as a stator as well as providing the structural support for the turbine rotor 12 and in addition provide the spring-compliant flexure for resisting the angular movement of the turbine rotor 12 induced by the reactive torque.

The stator vanes 50, while being relatively compliant to the angular deflection of the turbine rotor 12, provide a rigid support in the axial and radial directions such that the deflection produced is in direct correspondence with the torque. This insures that the deflection signal readings are not influenced by the axial load induced on the turbine rotor 12 by the reactive axially aligned force produced by the angular momentum change of the fluid flow.

A second set of flexural stator vanes (not shown) may also be provided secured to the trailing portion 53 of the turbine rotor hub 22 likewise secured to the sensor housing 14 to provide a balanced support for the turbine rotor 12.

In the alternate embodiment shown in FIGS. 6 and 7, there is likewise provided a front stator 60 and a rear stator 62. However, the stator vanes 60 and 62, respectively, are formed of relatively thick sections such as to provide a relatively rigid support in all directions of loading.

In this embodiment, a flexural pivot device 72 is utilized which is carried within a hub section 64 associated with the front stator assembly 56 and a hub section 66 associated with the rear stator 62. Each of the hubs 64 and 66 are pressed onto the end portions 68 and 70 of the pivotal flexure device 72.

The flexural pivot device 72 shown is commercially available and comprises a pair of annular sections 74 and 76, respectively. The annular section 74 is constituted by the ends 68 and 70 joined by an integral intermediate section 78. The other annular section 76 includes a hub section 80 to which is affixed the turbine rotor blades 26, partially shown in FIG. 7.

Each of the annular sections 74 and 76 are interconnected by transverse radially extending webs, perpendicular to the axis of the longitudinal axis of sensor 10.

A first set comprised of first webs 82 and 84 extend parallel to each other and are connected at one end to the annular member 74 and at the other end to the central annular member 76 by extension portions 86 and 88 extending within the end sections 68 and 70, respectively. The second central web 90 is transversely or diagonally extending with respect to the webs 82 and 84 likewise interconnecting the annular member 74 and the annular member 76.

The extensions 86 and 84 extend into recesses formed in the end sections 68 and 70 with a clearance 92 therebetween and a similar one at the other end (not shown) such as to provide a mechanical stop means limiting angular deflection to a predetermined extent of relative rotation between the annular member 76 and the annular member 74.

The webs 82, 84 and 90 are thus disposed so as to resist the radial and axial loads while their compliance to bending provides a flexural restraint means interconnecting the annular member 74 and the annular member 76. This in turn provides the connection to support the turbine hub 80 on the stator hubs 64 and 66 in such a way as to be relatively stiff to axial and radial loads and resiliently compliant to torque loads.

Such devices are commercially available and may be obtained in a variety of sizes at relatively low cost and a variety of performance characteristics with varying spring rates which are very satisfactorily suited to provide the flexural restraint means 20 as described diagrammatically in FIG. 1.

As noted, the support of the turbine rotor 12 in the mode depicted in FIGS. 1 and 4 through 7 constitutes a spring mass system which will oscillate in the absence of aerodynamic or mechanical damping, in which case the turbine rotor 12 may oscillate particularly at certain mass flow rates through the sensor 10. Alternatively to the notch filter shown in FIG. 1, the effect on the output signal may be eliminated by incorporating a suitable damper 100 (FIG. 8) drivingly connected with the turbine rotor 12 so that the oscillations are damped out.

The dynamic response of the pressure sensor 10, according to the present invention, may be maximized by reducing the deflection of the turbine rotor 12 essentially to zero by the provision of a rigid arm 102 (FIG. 9) connected to the rear hub portion 24 of the turbine rotor 12. The turbine rotor 12 is supported by the flexural restraint means 20 on its front hub portion 24 as shown with either of the forms of support means such as shown in FIGS. 4 and 6 being utilized. The rigid arm 102 is in engagement at its outer end with a force transducer 104 such as a vibrating quartz crystal. This device utilizes the change in operating frequency of an edge loaded crystal to indicate the force which has been applied to the crystal. The mechanical spring rate is very high and only micro-inch deflection occurs. Thus, the turbine rotor angular deflection spring rate is very high and the dynamic response is optimized.

As an alternate variation, the force transducer 104 may be replaced with a displacement transducer which is an LVDT transducer as an alternate embodiment to strain gages directly applied to the flexural restraint 20.

The equation developed above in connection with the relationship between the mass flow rate and torque indicates that this is a square law function, and which is plotted in FIG. 10a. With increasing flow rates, the torque and the deflection for deflection monitoring embodiments increases at an increasing rate with higher flow rates if a linear spring is utilized to resist the rotor torque. According to the present invention, a nonlinear spring may be used in driving relationship with the turbine rotor 12. The deflection which may be sensed can be converted to alternate functions of rotor torque by converting the output signal to a more desired relationship with mass air flow. This is indicated by the alternate plotting in FIG. 10b as noted therein.

Such a nonlinear spring may be provided by variable length cantilever beams as shown in FIG. 11 in diagrammatic form. In this case, the turbine rotor hub 22 has affixed thereto a rigid arm 106 which engages at its outer end the outer end of a cantilever arm 108. Disposed beneath the cantilever arm 108 is either a curved surface or a stepped post arrangement 110 in which successively lower surfaces are presented to the undersurface of the cantilever arm 108. As the cantilever arm 108 deflects by angular deflection of the rigid arm 106, the effective length of the cantilever arm 108 is decreased as successive contacts are made with the elements 110. Since the cantilever arm 108 is in effect shortened in length, the spring rate increases to produce the nonlinear increasingly stiff spring rate which can be put into driving engagement with the turbine rotor 22 as shown.

In order to obtain a readout of the deflection of the cantilever arm 108, a link arm 114 may be provided drivingly connected to an arm 116 having conventional strain gages 118 suitably affixed thereto. Alternatively, an LVDT transducer or other displacement transducer is utilized to produce an output signal corresponding to the degree of deflection of the cantilever arm 108. This provides a nonlinear spring rate which produces a nonlinear deflection in response to the deflection of the turbine rotor 12 such as to produce an output signal from a deflection sensing means which changes the correspondence between the torque to one in which with increasing flow rates, a decreasing rate of deflection and a decreasing rate of the output signal increase will be produced. The spring rate could also be selected such as to produce a linear output by suitably matching the spring characteristics to the square law function of mass flow rate versus torque, such as to produce the intermediate curves shown in FIGS. 10c and 10d to produce an essentially linear relationship.

However, this approach will often not be necessary since the easy availability of such computation capability and electronic control systems allows easy handling of the electrical output signal even though it is nonlinear as long as it is predictable as is the case in the present system.

It has been discovered by the present inventors that there are critical relationships between the ratio between the diameter of the hub section of the turbine rotor 12 and the outer diameter defined by the turbine rotor vanes as it affects the dynamic response of the turbine rotor 12. This has been arrived at by the following analysis in which certain simplifying assumptions are made and which typical assigned values were given to the assigned factors in order to simplify the calculation. The object of these calculations is to determine if there is an optimum relationship. To maximize the torque developed by the forces exerted on the turbine rotor blades by the air flow, the distance from the turbine axis to the effective radius turbine blades would be maximized. This of course also maximizes the mass moment of inertia which minimizes the dynamic response of the turbine rotor. It is this trade-off that is analyzed below:

To derive an annular radius ratio as a function of maximum angular acceleration, the following assumptions regarding linear terms are assigned in order to simplify the calculation. (These assigned values in no way compromise the results, they only remove all but the sought variables.)

(1) Constant annular air flow section=5.0 IN$^2$.

(2) Total resultant effective force exerted on all blades due to air flow ($F_c$)=1 lb.

(3) Simulated turbine configuration: annular disk, with $R_o$=outer radius; $R_i$=inner radius; disk thickness+0.05 inch and material density=0.283.

NOTE: This simulates the turbine blades only, since the blades contribute much more inertia than does the hub. The hub inertia is neglected to simplify the example.

DEFINITIONS $T_1, T_2$ = torque;
$F_c$ = effective force developed from the airflow;
$R_c$ = effective radius through which the effective blade force developed from the air flow acts;
$R_o$ = outside annular radius;
$R_i$ = inside annular radius;
$M_o - M_i$ = annular mass;
$\rho$ = material density;
$\alpha$ = angular acceleration;
$t$ = simulated rotor thickness.

DERIVATION

The torque developed by the total resultant force on the blades, a distance $R_c$ from the axis of rotation is:

$$T_1 = FR_c \quad (1)$$
$$\text{Where: } R_c = R_i + \tfrac{1}{2}(R_o - R_i)$$
$$\text{Therefore: } T_1 = F_c(R_i + \tfrac{1}{2}(R_o - R_i))$$

The torque necessary to accelerate a mass with an angular acceleration is:

$$T_2 = I\alpha \quad (2)$$
$$\text{Where: } I = \tfrac{1}{2} M_o R_o^2 - \tfrac{1}{2} M_i R_i^2$$
$$= \tfrac{1}{2} \pi \rho t (R_o^4 - R_i^4)$$
$$\text{Therefore: } T_2 = \tfrac{1}{2} \pi \rho t (R_o^4 - R_i^4)$$

Equating (1) and (2):

$$\alpha = \frac{F_c(R_i + \tfrac{1}{2}(R_o - R_i))}{\tfrac{1}{2} \pi \rho t (R_o^4 - R_i^4)} \quad (3)$$

If the annular area is kept constant, a radius ratio can be established and $R_o$ and $R_i$ determined. This information substituted into equation (3) will yield a unique solution for an angular acceleration as a function of an angular radius ratio. Choosing a range of ratios and solving for angular acceleration will yield a plot as shown in FIG. 12.

EXAMPLE CALCULATION (a) Annular area $(a) = 5$ in.$^2$
(b) Say $R_o = 2.000$ in.

Then $R_i = \sqrt{R_o^2 - 1.59} = \sqrt{(2.00)^2 - 1.59}$
$R_i = 1.5524$ in.

(c) $\dfrac{R_o}{R_i} = \dfrac{2.00}{1.5542} = 1.288$ (d) $R_c = R_i + \tfrac{1}{2}(R_o - R_i) = 1.5524 + \tfrac{1}{2}(2.00 - 1.5524)$ (e) $I = \tfrac{1}{2} \pi \rho t (R_o^4 - R_i^4) = \tfrac{1}{2} \pi (.283) \times (.05) \times 1/386) \times ((2.00)^4 - (1.7762)^4)$
$I = .000587$ (f) $= \dfrac{(F)(R_c)}{1} = \dfrac{(1)(1.7762)}{.000587}$
$= 3025.89$ Radians/min$^2$ The results of the above iterative calculation are plotted in FIG. 12.

The plot of FIG. 12 shows a drastic improvement in response, i.e., angular acceleration as the ratio $R_o$ over $R_i$ increases from 1.0 to approximately 2.0 with an optimal value at a ratio of 4.0 with a slow but steady decline thereafter. Thus, the ratio of the outside radius to the inside radius should be kept at a value greater than 2.0 and as a practical matter less than a ratio of 8.0.

Typical installations of the flow sensor 10 in internal combustion engine applications are shown in FIGS. 13 through 16.

In FIG. 13, a plenum chamber 120 has a snorkel tube 122 within which the air sensor 10 is press-inserted. An air filter 124 receives the air flow with a connected flexible tube 126 connected to the snorkel tube 122.

In FIG. 14, sensor 10 is provided in an extension tube 128 connected to the flexible tube 126 and air filter 124 leading to the plenum chamber 120 and snorkel tube 122.

Figure 15:
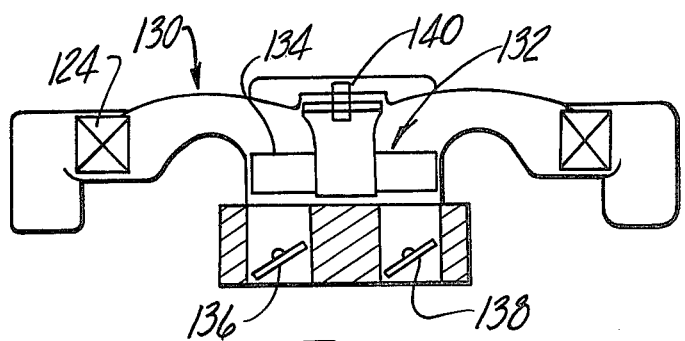
FIG. 15 is an elevational view in partial section of the mass air flow sensor installed in an automotive air cleaner installation which the radial flow through the air cleaner is caused to pass axially through the air flow sensor after passing through the air filter element.

In FIG. 15, an air flow sensor is incorporated in a specially configured air cleaner 130 in which the air flow after passing through the air filter element 124 is diverted from flow in a radial direction to that of an axial direction into a central passage 132 within which is disposed a turbine rotor 134 according to the present invention. This is just ahead of throttle plates 136 and 138 such as to place the air flow sensor into the closest possible juxtaposition at a point at which the air flow is to be determined. Torque sensing device 140 is located above the turbine rotor 134.

Figure 16:
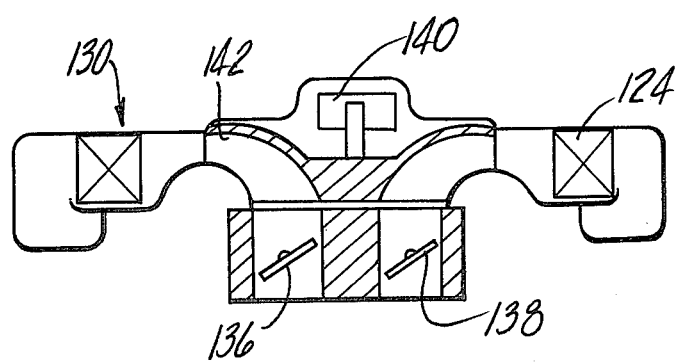
FIG. 16 is an elevational view in partial section of another radial flow air cleaner installation in which the air passes the rotor in combination of radial and axial flow directions.

In FIG. 16, a radial flow turbine rotor 142 is positioned to receive air flow after passing through the air filter 124.

It can thus be seen that the objects of the present invention have been achieved by the design disclosed above in that a very high dynamic response mass air flow sensor by the provision of a minimum or zero deflection restrained turbine rotor, which provides an accurate indication of the mass flow rate of the fluid flow by virtue of the entire flow passing through and deflected by the turbine vanes and imparting an angular momentum component to the fluid flow resulting in reactive forces which are a function of the fluid mass flow rate. In addition, the provision of a turbine support means which combines the function of flow straightening stator vanes as well as the structural support for the turbine rotor yields a simple, rugged but effective design, very much adapted to the automotive environment. The electrical output signals are compatible with the signal processing capabilities of electronic fuel control systems such as to readily adapt the sensor to this application. The absence of friction and hysteresis due to inherent dithering action insures accuracy and predictability and also improves the dynamic response of the sensor.

The use of the nonlinear rate springs in conjunction with the utilization of the torque reaction arising from the reactive forces imposed on the turbine rotor by the angular momentum change allows tailoring of the electric output signal to the particular application requirements in a nonlinear or linear function of mass rate. The optimum ratio of the hub diameter to the outside diameter has also been provided which further maximizes the dynamic response of the turbine rotor achieving an optimal balance between the moment of inertia of the turbine rotor and the development of a torque by virtue of a lever arm afforded by the outboard radial position of the turbine vanes on the turbine hub, maximizing the dynamic response performance of the sensor.

The resulting structure is quite compact and self-contained and readily adaptable to installation in automotive applications in conjunction with air induction apparatus or the air cleaner itself.

The embodiments of the invention in which an exclusive property or privilege is claimed are defined as follows:

1. A sensor for measuring the mass rate of flow of a fluid comprising:
a sensor housing having a passage receiving said fluid flow to be measured;
turbine rotor mounted in said housing, said turbine rotor including a hub portion and a plurality of vanes mounted thereto configured to receive substantially all of said fluid flow in said sensor housing and deflect the flow to impart a change in angular momentum to the fluid;
turbine rotor support means disposed in said sensor housing restraining said turbine rotor against movement in said housing in reaction to said change in angular momentum to said fluid flowing therethrough;
means sensing a reactive force on said turbine rotor support means by said change in angular momentum imparted to said fluid flow therethrough and generating corresponding electrical signals;
means sensing the density of fluid flowing through said sensor housing and generating signals corresponding thereto; and,
means generating electrical signals corresponding to the rate of mass flow of said fluid flow from said electrical signals corresponding to a reactive force and said fluid density, whereby a mass rate of fluid flow sensor is provided.

2. The sensor according to claim 1 wherein said means sensing a reactive force includes means for sensing a torque imposed on said turbine rotor by said change in angular momentum.

3. The sensor according to claim 1 further including stator vanes fixed to said sensor housing upstream of said turbine rotor and parallel to said turbine rotor axis absorbing the angular momentum of said fluid prior to entering said turbine rotor.

4. The sensor according to claim 3 wherein said support means includes said stator means.

5. The sensor according to claim 1 wherein said turbine vanes are helically curved with respect to the axis of said turbine rotor to produce a reactive force generating a torque on said turbine rotor by the change in angular momentum imposed on said fluid.

6. The sensor according to claim 5 wherein said support means includes flexural restraint means compliant to angular deflection of said turbine rotor, but rigid against axial and radial movement of said turbine rotor, said flexural restraint means developing a spring force acting on said turbine rotor upon angular deflection of said turbine rotor corresponding to said reactive torque.

7. The sensor according to claim 6 wherein said means generating electrical signals corresponding to a reactive force comprises means generating electrical signals corresponding to angular deflection of said flexural restraint means.

8. The sensor according to claim 7 wherein said means generating said electrical signals corresponding to angular deflection of said turbine rotor includes strain gage means.

9. The sensor according to claim 5 wherein said turbine rotor support means comprises a flexural restraint means resiliently compliant to angular deflections of said turbine rotor, but rigid to axial radial forces exerted on said turbine rotor, and wherein said means generating electrical signals corresponding to said reactive force comprises a force transducer and means drivingly interengaging said turbine rotor and said force transducer creating a corresponding force on said force transducer applied by said torque exerted on said turbine rotor by fluid flow therethrough.

10. The sensor according to claim 9 wherein said force transducer is essentially rigid to said applied force, whereby said turbine rotor remains angularly fixed at increased torques produced by increasing mass rates of fluid flow therethrough.

11. The sensor according to claim 9 wherein said flexural restraint means further includes mechanical stop means preventing relative rotation of said turbine rotor after a predetermined extent of angular rotation thereof.

12. The sensor according to claim 9 further including mechanical damping means drivingly connected to said turbine rotor damping angular oscillations of said turbine rotor during fluid flow therethrough.

13. The sensor according to claim 9 wherein said means for generating electrical signals further includes a notch filter receiving said electrical signals from said means sensing said torque imposed on said turbine rotor, said notch filter removing oscillations in said electrical signals at the natural frequency of oscillation of said turbine rotor-flexural constraint means system.

14. The sensor according to claim 5 wherein said turbine rotor support means includes a flexural restraint means supporting said turbine rotor in said turbine housing compliant to limited angular deflection of said turbine rotor and wherein said means generating electrical signals corresponding to a reactive force includes spring means having a nonlinear spring rate such that with increasing force applied to said spring means produces decreasing deflections, and further including means drivingly interengaging said turbine rotor and said nonlinear spring so as to cause said nonlinear spring means to deflect in response to exerted of said torque by fluid flow therethrough, and further including means generating said electrical signals corresponding to deflection of said nonlinear spring, whereby changes in said electrical signals for a given change in flow rate decrease with increasing fluid flow rates.

15. The sensor according to claim 5 wherein said turbine support means comprises a flexural restraint means supporting said turbine rotor compliant to limited angular deflection of said turbine rotor but providing rigid support against axial and radial movement of said turbine rotor.

16. The sensor according to claim 15 wherein said flexural restraint means includes a plurality of thin webs fixed along one side relative to said sensor housing and fixed along another side fixed relative to said turbine rotor and extending radially parallel with the axis of said turbine rotor, said thin webs being relatively compliant to bending forces applied by said angular deflection of said turbine rotor.

17. The sensor according to claim 16 wherein said plurality of thin webs are extended radially outwardly into engagement with said sensor housing located upstream and proximate to said turbine rotor, whereby said thin webs act as stator vanes absorbing any angular momentum of said fluid prior to entry into said turbine rotor vanes.

18. The sensor according to claim 17 wherein said plurality of webs are located radially intermediate the angular position of said turbine vanes, whereby the effect of turbulence induced by the wake of said webs is minimized.

19. The sensor according to claim 16 wherein said support means further includes a plurality of rigid webs spaced radially outward from said compliant webs, and wherein said flexural restraint includes a first hub member affixed to said rigid webs and said compliant webs, and also includes a second hub affixed to said turbine rotor hub and said compliant webs.

20. The sensor according to claim 15 wherein said flexural restraint includes said plurality of stator vanes, said stator vanes being relatively compliant to bending forces applied by said angular deflection of said turbine rotor.

21. The sensor according to claim 5 wherein the ratio of the outer diameter of said turbine rotor to the diameter of said hub portion is 2.0 or greater.

22. The sensor according to claim 21 wherein said ratio is approximately 4.0.

23. The sensor according to claim 21 wherein said ratio is in the range of 4.0 to 8.0.

24. The fluid flow sensor according to claim 21 wherein the ratio of the outer diameter of said turbine rotor to the diameter of said hub portion is greater than 2.0.

25. The sensor according to claim 21 wherein said ratio is approximately 4.0.

26. The sensor according to claim 21 wherein said ratio is in the range of 4.0 to 8.0.

27. The sensor according to claim 5 wherein the solidity ratio of said turbine vanes defined by the ratio of the chordal distance to the spacing of said turbine vanes is 1.0 or greater, whereby all of said fluid flow is imparted with an angular momentum change by passing through said turbine vanes.

28. The sensor according to claim 1 wherein said means for sensing the density of said fluid includes sensing means for sensing the temperature and pressure of said fluid.

29. The sensor according to claim 1 wherein said turbine rotor support means comprises means for axially compliant mounting said turbine rotor and rigid mounting against angular and radial movement, and means for detecting the axial force exerted on said turbine rotor and generating corresponding signals, whereby said reactive force sensed is aligned with the axis of the turbine rotor.

30. The sensor according to claim 29 wherein said means generating signals corresponding to said reactive force further includes means generating signals corresponding to the pressure drop of said fluid across said turbine rotor.

31. A fluid flow sensor for generating a signal corresponding to the rate of fluid flow in a passage, said sensor comprising:
 a sensor housing comprising a section of circular tubing adapted to be positioned in said passage to receive the fluid flow therethrough;
 a turbine rotor comprised of a hub portion and a plurality of radially extending turbine vanes affixed to said hub portion configured to create an angular momentum change on fluid flowing therethrough;
 turbine support means comprised of a plurality of radially extending stator vanes fixed to said sensor housing at a location upstream of said turbine rotor, said support means also including means supporting said turbine rotor on said stator vanes and controlling the angular momentum of said fluid flowing through said turbine rotor;

means sensing the reactive force imposed on said turbine rotor by said change in angular momentum imposed on said flowing fluid by said turbine vanes and generating a signal corresponding thereto;

whereby a signal corresponding to fluid flow rate through said sensor housing is provided;

said turbine support means being resiliently compliant to limited deflection of said turbine rotor responsive to imposition of said reactive force, and wherein said reactive force includes means sensing the deflection of said turbine rotor support means in response to imposition of said reactive force;

said means sensing a reactive force comprising means for sensing a torque imposed on said turbine rotor by said change in angular momentum;

said turbine vanes being helically curved along the axis of said turbine rotor to produce a reactive force generating a torque on said turbine rotor by the change in angular momentum imposed on said fluid;

said turbine support means including a flexural restraint means providing resilient compliance to said angular deflection while providing rigid support against axial and radial forces imposed on said turbine rotor;

said means generating signals corresponding to a reactive force comprising means generating electrical signals corresponding to said angular deflection of said flexural restraint means including strain gage means affixed to said flexural restraint.

32. A fluid flow sensor for generating a signal corresponding to the rate of fluid flow in a passage, said sensor comprising:

a sensor housing comprising a section of circular tubing adapted to be positioned in said passage to receive the fluid flow therethrough;

a turbine rotor comprised of a hub portion and a plurality of radially extending turbine vanes affixed to said hub portion configured to create an angular momentum change on fluid flowing therethrough;

turbine support means comprised of a plurality of radially extending stator vanes fixed to said sensor housing at a location upstream of said turbine rotor, said support means also including means supporting said turbine rotor on said stator vanes and controlling the angular momentum of said fluid flowing through said turbine rotor;

means sensing the reactive force imposed on said turbine rotor by said change in angular momentum imposed on said flowing fluid by said turbine vanes and generating a signal corresponding thereto;

whereby a signal corresponding to fluid flow rate through said sensor housing is provided;

said plurality of stator vanes being located radially intermediate the angular position of said turbine vanes, whereby the effect of turbulence induced by the wake of said stator vanes is minimized.

* * * * *